United States Patent [19]

Noonan

[11] 4,009,223
[45] Feb. 22, 1977

[54] THIN FILM ELECTROSTATIC EPOXY COATING POWDER

[75] Inventor: Charles M. Noonan, Pittsburgh, Pa.

[73] Assignee: Westinghouse Electric Corporation, Pittsburgh, Pa.

[22] Filed: May 8, 1974

[21] Appl. No.: 468,336

[52] U.S. Cl. .................. 260/830 TW; 260/18 EP; 260/836; 260/837 R; 427/27; 427/185; 428/418

[51] Int. Cl.² ......................................... C08L 63/00

[58] Field of Search ................ 260/18 EP, 830 TW

[56] References Cited

UNITED STATES PATENTS

| | | | |
|---|---|---|---|
| 3,374,193 | 3/1968 | Tsatos | 260/18 EP |
| 3,388,185 | 6/1968 | Goldberg | 260/830 TW |
| 3,446,762 | 5/1969 | Lopez | 260/18 EP |
| 3,477,971 | 11/1969 | Allen | 260/830 TW |
| 3,484,398 | 12/1969 | Childs | 260/830 TW |
| 3,647,726 | 5/1972 | Ulmer | 260/18 EP |
| 3,706,684 | 12/1972 | Lopez | 260/18 EP |
| 3,842,035 | 10/1974 | Klaren | 260/830 TW |
| 3,882,064 | 5/1975 | Pregmon | 260/830 TW |

*Primary Examiner*—Paul Lieberman
*Attorney, Agent, or Firm*—R. D. Fuerle

[57] ABSTRACT

A coating powder is made by preparing a composition of two different diglycidyl ethers of bisphenol A and a curing agent, extruding the composition, cooling it to form a solid, and grinding the solid into a powder. Wire or other articles are coated with the coating powder in an electrostatic fluidized bed or with an electrostatic gun and the powder is cured.

23 Claims, No Drawings

THIN FILM ELECTROSTATIC EPOXY COATING POWDER

BACKGROUND OF THE INVENTION

Epoxy coating powders are frequently used to form insulation on wires. While these powders have many desirable characteristics, they tend to be insufficiently flexible, or if flexible originally, they tend to lose their flexibility within a few days. When the coated wire is sharply bent, the inflexible insulation cracks.

PRIOR ART

U.S. Pat. No. 3,374,194 discloses a polyepoxide fluidized bed coating composition.

U.S. Pat. No. 3,484,398 discloses a powdered epoxy resin composition.

SUMMARY OF THE INVENTION

I have found that a coating powder prepared by extruding a composition of a mixture of two different epoxy resins, an epoxy ester, and a curing agent produces a more flexible insulation. The powder is especially suited for use with electrostatic guns or in electrostatic fluidized beds.

DESCRIPTION OF THE INVENTION

A composition is first prepared of (1) a first diglycidyl ether of bisphenol A having an E.E.W. (epoxy equivalent weight) of about 400 to about 900 and a melting point of about 70° to about 110° C, (2) a second diglycidyl ether of bisphenol A having an E.E.W. of about 750 to about 1400 and a melting point of about 100° to about 130° C, where the second diglycidyl ether is different from the first diglycidyl ether, (3) about 10 to about 60% (all percentages herein are by weight unless otherwise indicated), based on the total composition, of an epoxy ester, and (4) about 2 to about 8 phr (parts per hundred parts by weight of resin, where "resin" means the two diglycidyl ethers) of a curing agent for said diglycidyl ethers. The weight ratio of the first diglycidyl ether to the second is about 1 to about 12, and preferably is about 3 to about 5. The preferred composition, which produces the most flexible insulation, is prepared from (1) a first diglycidyl ether of bisphenol A having an E.E.W. of about 700 to about 875 and a melting point of about 85° to about 100° C, (2) a second diglycidyl ether of bisphenol A having an E.E.W. of about 780 to about 825 and a melting point of about 112° to about 120° C, (3) about 10 to about 60% of an epoxy ester, and (4) about 2 to about 5 phr of a curing agent for said diglycidyl ethers. A composition using about 40 to about 60% of the epoxy ester has better resistance to certain solvents such as chlorinated benzenes and is therefore preferred where the coating contacts these solvents.

THE DIGLYCIDYL ETHERS

The diglycidyl ethers of bisphenol A have the general formula:

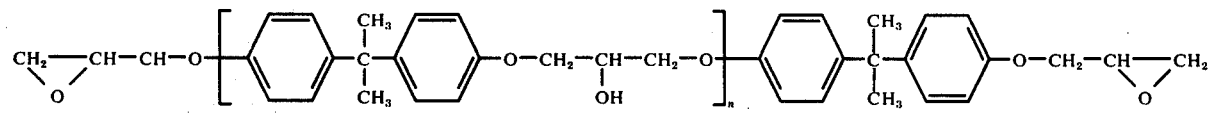

where $n$ determines the molecular weight and therefore the epoxy equivalent weight (E.E.W.) as is well known.

For some reason, which is not clear, a mixture of two different epoxy resins results in better properties, such as flexibility, than does a single epoxy resin of intermediate epoxy equivalent weight. The amount of each resin used should be within the limits stated since too much of the first epoxy resin may cause the composition to become too fluid in the extruder and the powder to drip when applied to a wire, and too little of the first epoxy resin may cause the coating to flow poorly and produce a rough finish.

THE EPOXY ESTERS

Essential to producing a flexible insulation is the presence of an epoxy ester of a dibasic acid in the composition. Also, the epoxy ester must be added to the extruder as the ester and not as epoxy and dibasic acid separately, since when they are added separately, the dibasic acid sticks to the extruder screw and cannot be extruded. The epoxy used in forming the epoxy ester is a diglycidyl ether of bisphenol A having an E.E.W. of about 400 to about 900 and a melting point of about 70° to about 110° C. Preferably, the diglycidyl ether of bisphenol A which is used has an E.E.W. of about 700 to about 875 and a melting point of about 85° to about 100° C. Preferably, the epoxy used is identical to the epoxy used in the mixture of epoxies since otherwise it is difficult to control the temperature zones in the extruder.

The dibasic acid has the formula HOOC $-(CH_2)_m-$ COOH where $m$ is from about 18 to about 54; $m$ is preferably about 36. However, in most commercial products the acids have a mixture of molecular weight and some monobasic and tribasic acids are also present. These esters may be prepared by heating the epoxy and the dibasic acid together, as is known in the art and is illustrated by the example which appears hereinafter.

THE CURING AGENT

The curing agent is preferably dicyandiamide because for thin films it reduces or eliminates pock marks and cratering. Other curing agents which may be used include pyromellitic diahydride, tetrahydrophthalic anhydride, benzophenone tetracarboxylic dianhydride, trimellitic acid, and other similar compounds.

Acid anhydrides are not as good as dicyandiamide in thin films because their high vapor pressure at curing temperatures leads to their rapid loss resulting in undercured, more brittle films. However, some of the standard anhydride curing agents which are sensitive to water can be partly esterified to produce curing agents having properties similar to dicyandiamide.

Aromatic amines give cured coatings with excellent chemical resistance and greater heat resistance than any other class of curing agents. However, the shelf life of these compositions is shorter and the color stability poor. Aliphatic amines give better color stability than aromatics but chemical and heat resistance and shelf life is also short. Examples of suitable amine curing agents include ethylene diamine, diethylene triamine, triethylene tetramine, dimethylamine propylamine, benzyldimethylamine, methylene dianiline, etc.

THE ACCELERATOR

The composition also preferably includes about 2 to about 8 phr (and preferably about 2 to about 5 phr) of an accelerator to decrease the cure time. This is important in wire coating since it is necessary to wind the wire onto spools immediately after it is cured. Less than the stated amount of curing agent or accelerator should be avoided as the composition may cure too slowly and more than the stated amount of curing agent or accelerator tends to reduce the flexibility of the insulation and render it brittle. The preferred accelerator is sold by Dow Chemical Company under the trademark "D.E.H. 40," which is believed to be a mixture of 2-methyl imidazole and dicyandiamide. That accelerator accelerates well but does not make the coating powder hygroscopic nor shorten its shelf life, and does not make the insulation brittle nor lower its electrical properties. A complete description of accelerators which are mixtures of dicyandiamide and an imidazole which can be used in this invention can be found in U.S. Pat. No. 3,631,150. Other accelerators which could be used include 2-methyl imidazole, dihydrazide, nitrohydrazide, stannous octoate, epoxy novalac resins, etc.

THE FLOW CONTROL AGENT

The composition also preferably includes about 0.5 to about 3.0% (all quantity percentages herein are by weight) of a flow control agent which produces a more uniform coating having a smoother, glossier appearance. If a flow control agent is not present, the coating tends to form pinholes, ciss, or craters during curing, and frequently orange peel effects may occur. The preferred flow control agent is a polyacrylate sold by Monsanto Chemical Company under the trademark "Modaflow." That flow control agent is preferred because it does not lessen the flexibility of the coating. Other suitable flow control agents include thixotropes such as fumed silica, pulverized asbestos, bentonite clay, etc.

The composition may also contain other optional ingredients such as up to about 8% of a dye.

PREPARATION OF THE POWDER

After the composition has been homogeneously dry mixed, it is placed in an extruder. The use of an extruder appears to be essential to obtaining a highly flexible coating. Two-roll mills and other types of mixers result in less flexible coatings. Especially advantageous is a type of extruder known as a kneader. A kneader functions in the same way as an extruder, but also imparts a reciprocating axial motion to the extruder screw or screws. A kneader is preferred because it gives a more homogeneous mixture and better properties, for example, better gloss. The extrusion is preferably performed near but above the melting point of the composition, which is usually at about 40° to about 100° C. Several heat zones are common, for example, the extruder may have a back zone at about 40° to about 60° C and a die at about 90° to about 100° C. The residence time in an extruder is typically about 2 to about 3 minutes, and if the extruder is a kneader, about 60 to about 90 seconds.

After extrusion the composition is cooled to a solid, and ground in a microcrusher to produce pieces about ¼ to about ½ inch in size. These pieces are ground in a pulverizer then passed through a sieve to obtain the powder. Fine powders are used for making thin coatings, but if the powder is too fine, it will not fluidize well and may create medical problems or an explosion hazard. Therefore, the particle size must be at least about 800 mesh (i.e., about 15 microns). On the other hand, the powder must be finer than about 100 mesh (i.e., about 149 microns) or it will not retain a charge well and may fall off the article to be coated when used in an electrostatic fluidized bed. Therefore, all of the particles in the powder must fall within the range of about 100 to about 800 mesh. A very good particle size is between 200 mesh (74 microns) and 400 mesh (37 microns).

COATING

The powder may be used in fluidized beds or other application apparatus, but an electrostatic gun or electrostatic fluidized bed is required to produce thin films (i.e., <2 mils); electrostatic coating also tends to produce a coating of more uniform thickness. The wire or article to be coated is charged with one polarity and the powder with the other, causing the powder to cling to the wire or article. Heat is then applied to melt and cure the powder.

The cure is typically performed in an oven at about 125° to about 200° C for about 1 to about 10 minutes. The cure time depends on the temperature. Higher temperatures are used for wire coating than for coating large surfaces. The curing time can often be reduced by using infrared or induction heating, which may be especially useful in coating wire. A wire coating of about 1 to 16 mils ordinarily results, depending on the size of the charge and other variables. Coatings of up to about 100 mils in thickness can be produced in an electrostatic fluidized bed by preheating the wire or article to be coated before passing it through the bed.

An especially desirable product using the coating powder of this invention is "thin film" (i.e., <2 mils) coated round, square, or rectangular wire of about 10 to about 200 mil copper, aluminum, steel, or other metal. However, the coating powder may also be used to coat and insulate other articles such as metal foil, transformer parts, printed circuit boards, fence wire, containers and lids, cans, coat hangers, bobby pins, etc.

The following examples further illustrate this invention.

EXAMPLE I

A dimeric fatty acid ester was prepared by forming the following composition:

| | |
|---|---|
| Solid diglycidyl ether of bisphenol A, EEW = 700 to 875, softening point = 85 to 100° C, sold by Dow Chemical Co. under the trademark "DER-663U" | 600 lbs. |
| Sodium carbonate | 73.6 grams |
| Dibasic acid of the formula COOH—$C_{36}H_{72}$—COOH sold by Emery Industries under the trademark "Empol 1022" | 59.6 lbs. |

The composition was cooked at 160° C to an acid value of 1. The "Empol 1022" includes some higher and lower dibasic acids ($C_{18}$ to $C_{54}$) and some monobasic and tribasic acids. Other "Empols" which may also be used include numbers 1010, 1012, 1014, 1016, 1018, 1024, 1040, and 1041.

The following composition was prepared:

| Ingredient | Parts by Weight |
|---|---|
| "DER-663U" | 18.76 |
| Mixture of 95% "DER-663U" and 5% polyacrylate flow control agent sold by Monsanto Chemical Co. under the trademark "Modaflow" (a viscous light amber liquid, specific gravity, 60/60° F = 1.00, density (lbs/gal) = 8.3, viscosity, S.U.S. at 210° F = 5000, viscosity (centistokes) at 98.9° C = 1150 SFS) | 6.54 |
| Solid diglycidyl ether of bisphenol A, EEW = 780 to 825, softening point = 112 to 120° C, sold by Dow Chemical Co. under the trademark "XD-3542" | 4.50 |
| Above-prepared dimeric fatty acid | 8.50 |
| Dicyandiamide | 0.95 |
| Accelerator sold by Dow Chemical Co. under the trademark "D.E.H. 40" | 0.95 |
| Cobalt Blue sold by Harshaw Chemical Co. under the trademark "RX - 7570" | 2.06 |
| Titanium dioxide | 1.10 |
| | 42.36 |

The composition was put through a "PR-46" kneader sold by the Buss Corp. The kneader was set with a feed hopper speed of 12.5 rpm and a screw speed of 54 rpm. The back heater, which heats the screw and rear zone of the kneader, was set at 48° C. The front heater, which heats the front zone of the kneader was set at 105° C and was monitored by a gauge which read 90° C. The die of the kneader was heated to 95° C. The kneader produced a 1 to 2 inch wide ribbon at a rate of 25 to 35 pounds/hour. The product was cooled in water-cooled squeeze rolls, crushed, then pulverized until 95 to 100% went through a 200 mesh screen. The powder which went through the screen was used for coating.

EXAMPLE II

Two hundred pounds of rectangular aluminum wire (0.114 inches by 0.182 inches) was coated in an electrostatic fluidized bed with the powder prepared in Example I. The thickness of the coating was about 1 to 5 mils.

The coated wire was elongated between 9 and 12% when the wire broke. The coating showed no cracks.

The coating passed a heat shock test consisting of a 10% elongation followed by heating for ½ hour at 175° C.

The wire was bent edgewise 90° around a 0.750 inch mandrel and flatwise 90° around a 0.500 inch mandrel. The coating did not crack.

The wire was subject to NEMA dielectric strength test MW-1000, Part 3, Paragraph 3.3.1 (1000 volt minimum) and KV breakdowns were obtained at 0.6, 1.3, 0.9, 0.7, 1.0, 0.7, 0.5, and 1.2 kilovolts.

In a severe test of flexibility, the wire was aged for 28 days at 150° C in a sealed tank filled with oil and transformer parts, then tested. Five tests were made for adhesion and flexibility. These tests consisted of mounting 10 inches of the wire between jaws, elongating 15% at a rate of 12 inches/min. ± 1 inch/min., then inspecting for cracks; 100% of the wire tested passed. Five tests were made for edgewise and flatwise bending as previously described; 100% of the wire tested passed the test. Twelve tests were made for dielectric strength. These tests consisted of wrapping ½ inch wide adhesive tape having a ¼ inch strip of aluminum foil along the center, 1 ½ times around the wire. A current is applied between the wire and the aluminum foil increasing 500 volts/sec. until the insulation fails. The insulation is considered to pass the test if it withstands 1000 volts without breakdown; 90% of the wire passed this test.

The wire was given the NEMA dielectric strength test MW-1000, part 3, paragraph 3.3.1 after 28 days of aging in oil at 150° C (1000 volt minimum) and the following breakdown voltages (in kilovolts) were observed: 0.96, 0.87, 0.87, 0.87, 0.95, 0.70, 0.86, and 0.94.

EXAMPLE III

For comparison, rectangular aluminum wire (0.114 inch by 0.89 inch) was coated with two commercial black epoxy powders and was subjected to similar tests. One coating was 6.8 mils thick on the flat surface and 7.3 mils thick on the edge surface and the other was 7.4 mils thick on the flat surface and 6.1 mils thick on the edge surface. Both coated wires passed all of the tests except the edgewise bend test after aging in oil for 28 days at 150° C.

EXAMPLE IV

Rectangular copper wire (0.129 inch by 0.258 inch) was coated in an electrostatic fluidized bed with the powder of Example I. The coating was 0.0094 inch thick on the flat surface and 0.0118 inch thick on the edge surface. The wire was pulled 10% with no break in the coating. It also passed the 90° edgewise and flatwise bend tests described in Example II. The average dielectric strength was 4088 volts. The wire was heated for ½ hour at 175° C and was again elongated 10% with no break in the coating. After heating for ½ hour at 300° C and elongating 10% the coating also showed no breaks but had begun to degrade.

EXAMPLE V

A rectangular aluminum wire, (0.32 inch by 0.325 inch) was coated in an electrostatic fluidized bed with the powder of Example I. The coating was 3 to 5 mils thick.

The coated wire was bent 90° edgewise and 180° flatwise then placed in a 150° C oven for 1 hour. The coating did not crack.

I claim:
1. A coating powder made by
   a. dry mixing a composition which comprises:
      1. a first diglycidyl ether of bisphenol A having an E.E.W. of about 400 to about 900 and a melting point of about 70° to about 110° C;
      2. a second diglycidyl ether of bisphenol A having an E.E.W. of about 750 to about 1400 and a melting point of about 100° to about 130° C, where said second diglycidyl ether is different from said first diglycidyl ether and the weight ratio of said first diglycidyl ether to said second diglycidyl ether is about 1 to 1 to about 12 to 1;
      3. about 10 to about 60% by weight based on the weight of the total composition of an epoxy ester, the epoxy portion of said ester being derived from a diglycidyl ether of bisphenol A having an E.E.W. of about 400 to about 900 and a melting point of about 70° to about 110° C, and the ester portion being derived from a dibasic acid having the formula HOOC—$(CH_2)_m$—COOH, where $m$ is about 18 to about 54; and

4. about 2 to about 8 phr of a curing agent for said diglycidyl ethers;
B. extruding said composition;
C. cooling said composition to form a solid; and
D. grinding said composition into a powder having a particle size of about 15 to about 74 microns.

2. A coating powder according to claim 1 wherein said composition comprises:
1. a first diglycidyl ether of bisphenol A having an E.E.W. of about 700 to about 875 and a melting point of about 85° to about 100° C;
2. a second diglycidyl ether of bisphenol A having an E.E.W. of about 780 to about 825 and a melting point of about 112° to about 120° C, where the weight ratio of said first diglycidyl ether to said second diglycidyl ether is about 3 to 1 to about 5 to 1;
3. about 10 to about 60% by weight based on the weight of the total composition of an epoxy ester, the epoxy portion of said ester being derived from a diglycidyl ether of bisphenol A having an E.E.W. of about 700 to about 875 and a melting point of about 85° to about 100° C, and the ester portion being derived from a dibasic acid having the formula $HOOC-(CH_2)_m-COOH$ where $m$ is about 18 to about 54; and
4. about 2 to about 5 phr of a curing agent for said diglycidyl ethers.

3. A coating powder according to claim 1 wherein said curing agent is dicyandiamide.

4. A coating powder according to claim 1 wherein said extrusion is performed near but above the melting point of said composition.

5. A coating powder according to claim 1 wherein said extrusion is performed in a kneader.

6. A coating powder according to claim 1 wherein said composition is ground to a powder having a particle size of about 100 to about 400 mesh.

7. A coating powder according to claim 1 wherein said composition includes about 2 to about 8 phr of an accelerator for said diglycidyl ethers.

8. A coating powder according to claim 7 wherein said accelerator is about 2 to about 5 phr of a mixture of about 20 to about 30% 2-methyl imidazole and about 70 to about 80% dicyandiamide.

9. A coating powder according to claim 7 wherein said composition includes about 10 to about 30% of a flow control agent.

10. A coating powder according to claim 1 wherein $m$ is about 36.

11. A coating powder according to claim 1 wherein the amount of said epoxy ester is about 40 to about 60%.

12. A coating comprising a cured film of a coating powder according to claim 1.

13. A method of making a coating powder comprising:
a. dry mixing a composition which comprises:
1. a first diglycidyl ether of bisphenol A having an E.E.W. of about 400 to about 900 and a melting point of about 70° to about 110° C;
2. a second diglycidyl ether of bisphenol A having an E.E.W. of about 750 to about 1400 and a melting point of about 100° to about 130° C, where said second diglycidyl ether is different from said first diglycidyl ether and the weight ratio of said first diglycidyl ether to said second diglycidyl ether is about 1 to 1 to about 12 to 1;
3. about 10 to about 60% by weight based on the weight of the total composition of an epoxy ester, the epoxy portion of said ester being derived from a diglycidyl ether of bisphenol A having an E.E.W. of about 400 to about 900 and a melting point of about 70° to about 110° C, and the ester portion being derived from a dibasic acid having the formula $HOOC-(CH_2)_m-COOH$ where $m$ is about 18 to about 54; and
4. about 2 to about 8 phr of a curing agent for said diglycidyl ethers;
B. extruding said composition;
C. cooling said composition to form a solid; and
D. grinding said composition into a powder.

14. A method according to claim 13 wherein said composition comprises:
1. a first diglycidyl ether of bisphenol A having an E.E.W. of about 700 to about 875 and a melting point of about 85° to about 100° C;
2. a second diglycidyl ether of bisphenol A having an E.E.W. of about 780 to about 825 and a melting point of about 112° to about 120° C, where the weight of ratio of said first diglycidyl ether to said second diglycidyl ether is about 3 to 1 to about 5 to 1;
3. about 10 to about 60% by weight based on the weight of the total composition of an epoxy ester, the epoxy portion of said ester being derived from a diglycidyl ether of bisphenol A having an E.E.W. of about 700 to about 875 and a melting point of about 85° to about 100° C, and the ester portion being derived from a dibasic acid having the formula $HOOC-(CH_2)_m-COOH$ where $m$ is about 18 to 54; and
4. about 2 to about 5 phr of a curing agent for said diglycidyl ethers.

15. A method according to claim 13 wherein said curing agent is dicyandiamide.

16. A method according to claim 13 wherein said extrusion is performed near but above the melting point of said composition.

17. A method according to claim 13 wherein said extrusion is performed in a kneader.

18. A method according to claim 13 wherein said composition is ground to a powder having a particle size of about 100 to about 400 mesh.

19. A method according to claim 13 wherein said composition includes about 2 to about 8 phr of an accelerator for said diglycidyl ethers.

20. A method according to claim 19 wherein said accelerator is about 2 to about 5 phr of a mixture of about 20 to about 30% 2-methyl imidazole and about 70 to about 80% dicyandiamide.

21. A method according to claim 19 wherein said composition includes about 10 to about 30% of a flow control agent.

22. A method according to claim 13 wherein $m$ is about 36.

23. A method according to claim 13 wherein the amount of said epoxy ester is about 40 to about 60%.

* * * * *